(12) United States Patent
Stansbury et al.

(10) Patent No.: US 9,003,927 B2
(45) Date of Patent: Apr. 14, 2015

(54) TIRE REPAIR TOOL

(71) Applicants: Ethan T. Stansbury, Tustin, CA (US); Brandt A. Haener, Los Osos, CA (US)

(72) Inventors: Ethan T. Stansbury, Tustin, CA (US); Brandt A. Haener, Los Osos, CA (US)

(73) Assignee: Illinois Tool Works Inc., Glenview, IL (US)

( * ) Notice: Subject to any disclaimer, the term of this patent is extended or adjusted under 35 U.S.C. 154(b) by 217 days.

(21) Appl. No.: 13/839,385

(22) Filed: Mar. 15, 2013

(65) Prior Publication Data
US 2014/0260811 A1  Sep. 18, 2014

(51) Int. Cl.
*B29C 73/08*  (2006.01)
*B29C 73/06*  (2006.01)
*B29L 30/00*  (2006.01)

(52) U.S. Cl.
CPC ............... *B29C 73/08* (2013.01); *B29C 73/06* (2013.01); *B29L 2030/00* (2013.01)

(58) Field of Classification Search
CPC ................................ B29C 73/06; B29C 73/08
USPC ..................................... 81/15.5, 15.7; 156/97
See application file for complete search history.

(56) References Cited

U.S. PATENT DOCUMENTS 6,170,361 B1 * 1/2001 Yates .............................. 81/15.7
2008/0264210 A1 * 10/2008 Brazeau ......................... 81/15.7

* cited by examiner

*Primary Examiner* — David B Thomas
(74) *Attorney, Agent, or Firm* — Pauley Petersen & Erickson

(57) ABSTRACT

A tire repair tool including a combined reamer and plugger wherein a single combined bit is fitted into a handle, the bit including a reamer element and a plugger element.

14 Claims, 1 Drawing Sheet

TIRE REPAIR TOOL

BACKGROUND OF THE INVENTION

1. Field of the Invention

This invention relates to a tire repair tool, specifically a combined reamer and plugger for repairing leaking tires.

2. Description of Related Art

Tire repair kits are generally used to patch a leaking hole in a pneumatic tire. A rubber plug is generally used to insert into the hole to prevent further leaking. Typical tire repair kits include a reamer for reaming and roughening a hole, one or more rubber plugs and adhesive for inserting into the hole, and a plugger for inserting the rubber plug into the hole. The process generally involves locating the hole in the tire through visual or audible inspection; reciprocating the reamer within the hole to prepare and roughen the hole for the plug; inserting a plug into the plugger with or without an adhesive addition; inserting the plugger into the hole; and removing the plugger while leaving the plug in the hole intact to thereby patch the hole.

Existing tire repair kits often necessarily include two separate tools: the reamer and the plugger as well as the plugs and adhesive. Alternatively, two separate reamer and plugger bits are provided that may be interchanged within a multi-use handle.

SUMMARY OF THE INVENTION

The present invention is directed to a tire repair tool in the form of a combination reamer and plugger for both reaming out a hole in a tire and feeding a plug into the hole.

In accordance with one aspect of the invention, there is provided a tool that includes a handle and a bit. The bit may be fixed or removable with respect to the handle. The bit preferably includes a reamer element along a shaft and a plugger element at a distal end of the shaft.

The reamer element preferably comprises a textured surface along the shaft for conditioning an inner surface of a hole to be patched. The plugger element preferably includes a looped end wherein a plug may be inserted and released within the hole. In such a manner, a single tool can accomplish a patching task that previously required two separate tools.

BRIEF DESCRIPTION OF THE DRAWINGS

The above-mentioned and other features and objects of this invention will be better understood from the following detailed description taken in conjunction with the drawings wherein.

DESCRIPTION OF PREFERRED EMBODIMENTS

Figure 1:
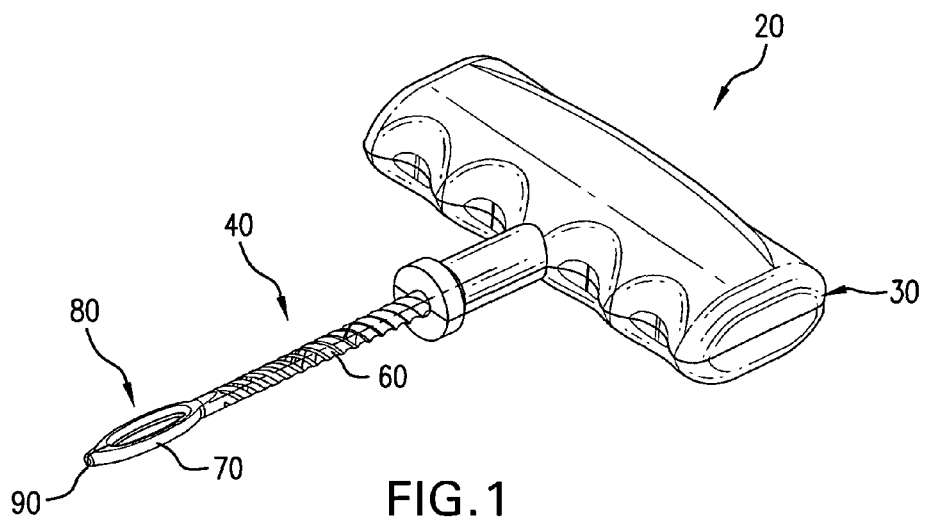
FIG. 1 is a front perspective view of a tire repair tool according to one preferred embodiment of this invention.
Figure 2:
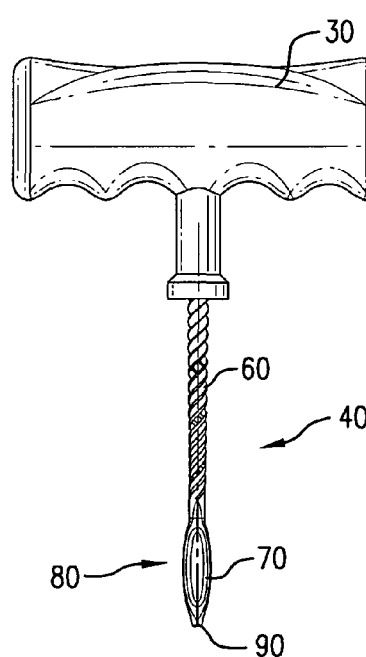
FIG. 2 is a front view of the tire repair tool shown in FIG. 1.
Figure 3:
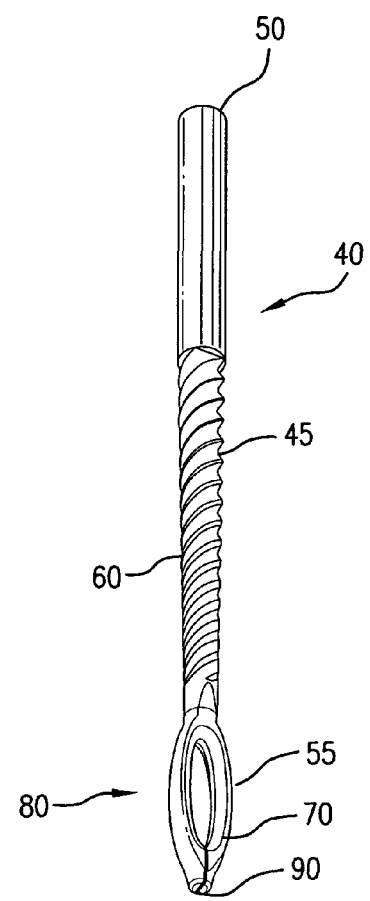
FIG. 3 is a front perspective view of a tire repair tool bit used in connection with the tire repair tool shown in FIG. 1.

FIGS. 1-3 show a tire repair tool 20, namely a combined reamer and plugger according to a preferred embodiment of this invention. The combined reamer and plugger is preferably used in connection with the repair of a leaky or damaged tire. While the broader practice of the invention is not necessarily limited to use with or in connection with the repair of tires, the invention is believed to have particular applicability for use in conjunction with the repair of other air-filled objects such as tubes, rafts, air mattresses, inflatable flotation devices or similar inflatable devices such as may find common application.

A tire repair tool 20 as shown in FIGS. 1-3 preferably includes a handle 30. The handle 30 may comprise a t-handle, such as shown in FIGS. 1 and 2, a pistol grip or similar ergonomic grip, a screwdriver format or any other suitable handle known to those having ordinary skill in the art. The handle 30 preferably permits a firm gripping engagement to generate torque, downward force and/or upward force for use and operation of the tire repair tool 20.

A bit 40, such as shown in FIGS. 1-3, is preferably connected with respect to the handle 30 and preferably includes a shaft 45 fixed into position at a proximal end 50 of the bit 40 within the handle 30. The bit is preferably constructed of a rigid material such as steel to withstand vigorous and repeated use of the tire repair tool 20. The bit 40 may be removably inserted into the handle 30 or alternatively may be fixed into the handle 30.

The bit 40 as shown and described herein preferably comprises a reamer element 60 having a surface texture 65 along at least a portion of the shaft 45 and a plugger element 70 at a distal end 55 of the shaft 45. The reamer element 60 is preferably positioned along the shaft 45 in a desired position to permit the reaming operation while enabling sufficient space along the shaft 45 for engagement with the handle 30 and the plugger element 70 described below.

The reamer element preferably includes a surface texture 65 such as shown in FIGS. 1-3, wherein the texture comprises a swirled shaft. Alternatively, the texture may comprise a knurled shaft, a roughened shaft or alternate texture for creating the desired surface within the hole of the leak. The texture preferably extends for a sufficient distance along the shaft 45 to enable proper conditioning of the hole with minimal strokes.

The plugger element 70 preferably comprises a looped end 80 at the distal end of the shaft 45. More specifically, the plugger element 70 may comprise a closed loop, such as shown in FIGS. 1-3. Alternatively, the looped end may comprises an open loop, such as a hook for inserting into the hole to be patched. In either embodiment, the looped end 80 preferably comprises a sharpened tip 90 for enabling insertion of the tire repair tool 20 into the hole to be plugged. The looped end 80 is desirably elongated so as to permit insertion and removal of the tire repair tool 20 within the hole to be repaired while still permitting insertion of the plug within the looped end 80 and removal of the plug within the hole following the patching operation.

The tire repair tool 20 accordingly includes both a reamer element 60 and a plugger element 70 for quick and efficient patching of a leaking tire. In practice, an associated method of patching a tire includes the steps of locating a hole in a tire or other object and inserting the bit 40 with the reamer element 60 into the hole and reciprocating the reamer element 60 within the hole. Either before or after this step, a plug may be inserted into the bit 40 at the looped end 80 of the plugger element 70 at a distal end 55 of the bit 40. The order in which the plug is placed into the bit 40 is not critical as the reamer element 60 comprises a different portion of the shaft as the plugger element 70 and therefore the plugger element 70 does not interfere with the reaming step of the process. The bit 40 is then removed from the hole as the plug is released into the hole to complete the patching operation.

While in the foregoing specification this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

What is claimed is:

1. A tire repair tool comprising:
   a handle;
   a bit having a shaft fixed into position at a proximal end within the handle, the bit comprising a reamer element having a surface texture along at least a portion of the shaft and a plugger element having a looped end at a distal end of the shaft.

2. The tire repair tool of claim 1 wherein the texture comprises a swirled shaft.

3. The tire repair tool of claim 1 wherein the texture comprises a knurled shaft.

4. The tire repair tool of claim 1 wherein the texture comprises a roughened shaft.

5. The tire repair tool of claim 1 wherein the looped end comprises a closed loop.

6. The tire repair tool of claim 1 wherein the looped end comprises an open loop.

7. The tire repair tool of claim 1 wherein the bit is removably inserted into the handle.

8. The tire repair tool of claim 1 wherein the bit is fixed into the handle.

9. The tire repair tool of claim 1 wherein the looped end comprises a sharpened tip.

10. The tire repair tool of claim 1 wherein the handle comprises one of a t-handle, a pistol grip and a screwdriver format.

11. A tire repair tool comprising a handle and a bit having both a reamer element along a shaft and a plugger element at a distal end of the shaft, wherein the reamer element includes a surface texture and the plugger element includes a sharpened looped end.

12. The tire repair tool of claim 11 wherein the handle is integrated with the bit.

13. The tire repair tool of claim 11 wherein the bit is removable from the handle.

14. A method of patching a tire comprising the steps of:
   locating a hole in a tire;
   inserting a bit having a reamer element with a surface texture along a shaft of the bit into the hole and reciprocating the reamer element within the hole;
   inserting a plug into a plugger element within a looped end at a distal end of the bit; and
   inserting the bit into the hole and releasing the plug into the hole.

* * * * *